United States Patent Office 2,807,015
Patented Sept. 17, 1957

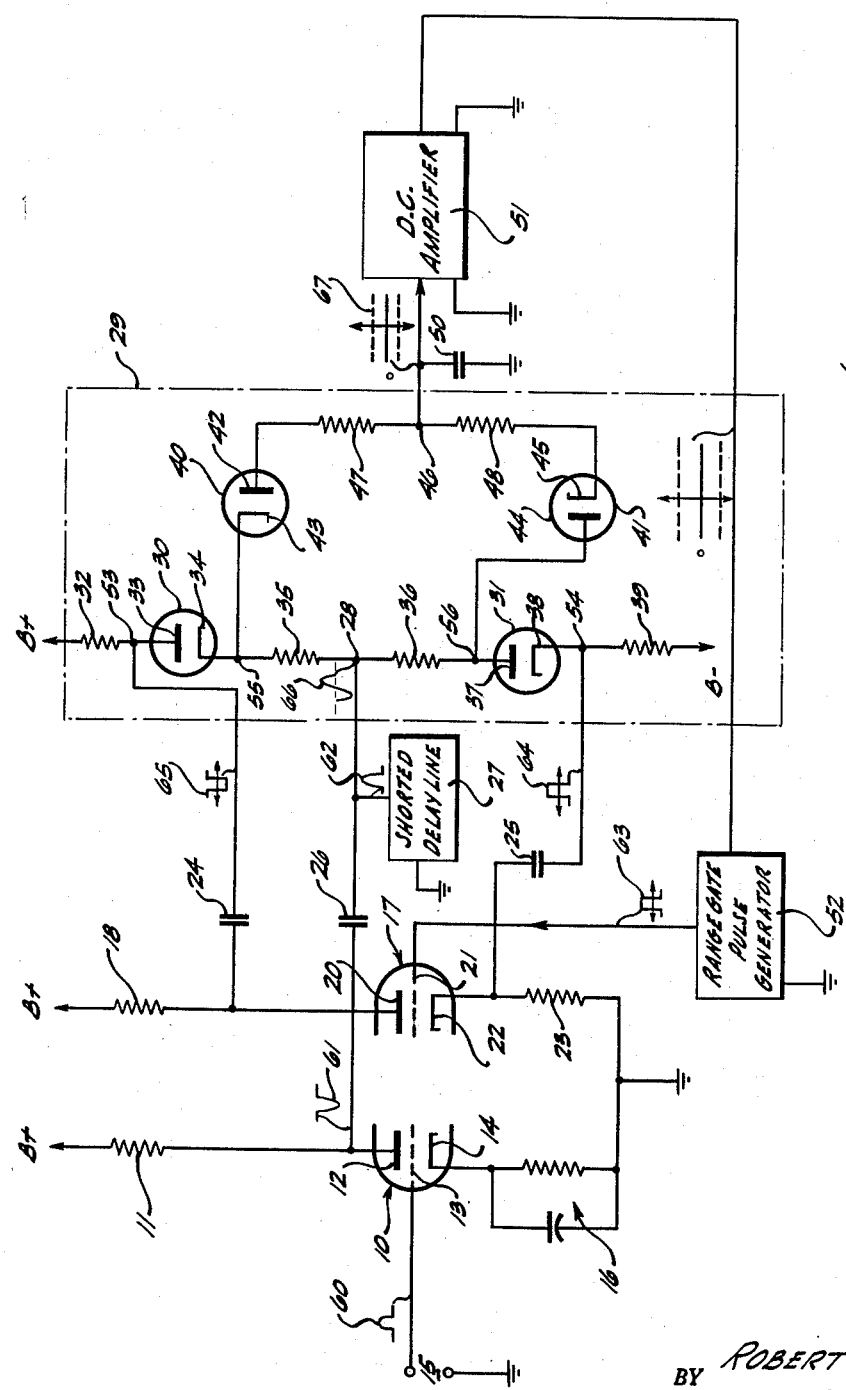

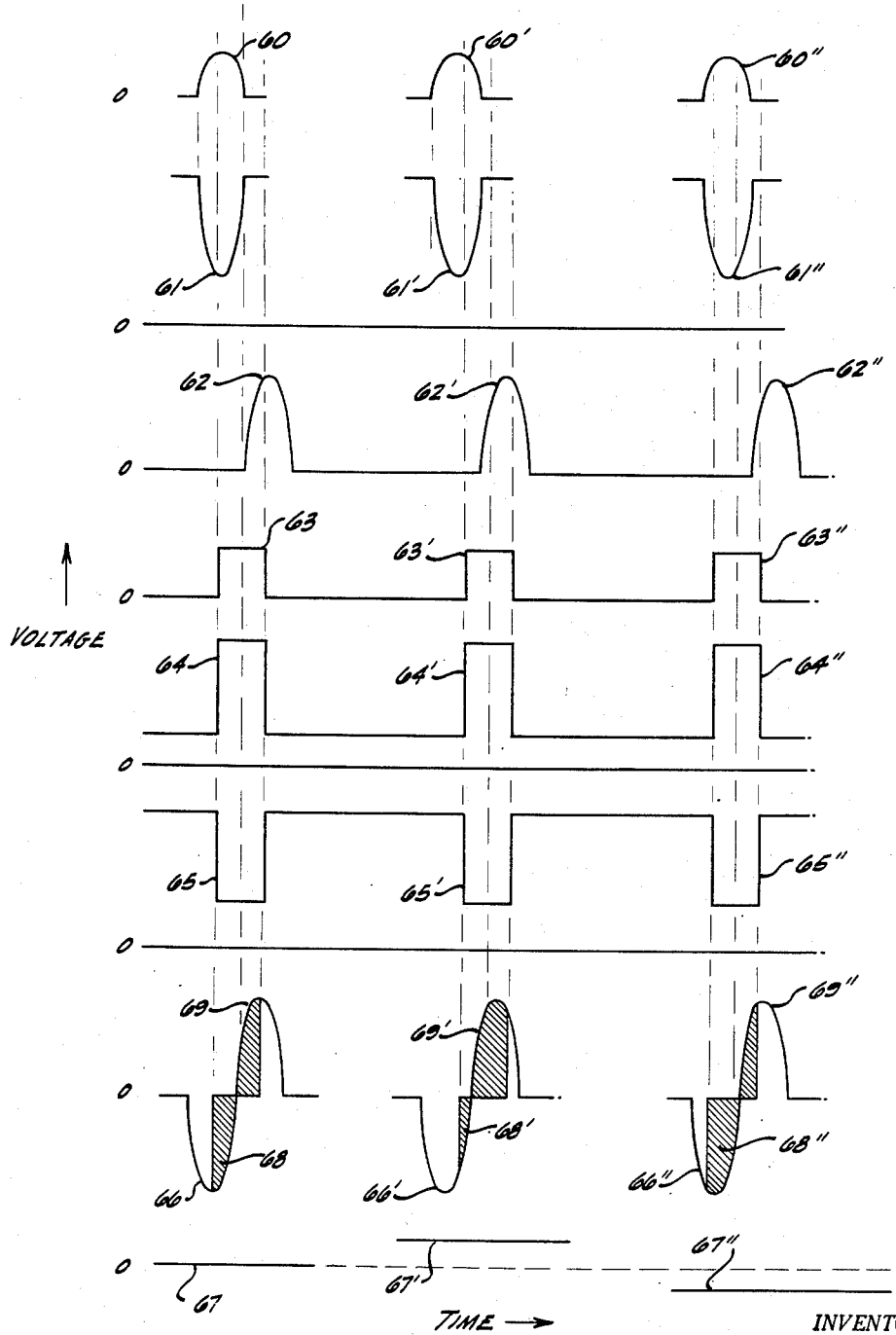

2,807,015

RANGE VOLTAGE GENERATING CIRCUIT FOR AUTOMATIC RANGE TRACKING

Robert J. Shank, Encino, Calif., assignor, by mesne assignments, to Hughes Aircraft Company, a corporation of Delaware Application March 9, 1953, Serial No. 341,314

7 Claims. (Cl. 343—7.3)

The present invention relates to a circuit for comparing the time of occurrence of two pulses and more particularly to a range voltage generating circuit of the type used in radar systems for automatic range tracking.

While the invention is useful in any application wherein an indication is desired of the difference in the time of occurrence of two pulses, it will be described here in connection with the application of this circuit to a radar system to provide automatic range tracking.

Automatic range tracking makes it possible to provide continuous, automatic, and accurate target range information. To obtain such information, a radar system conventionally includes a range-tracking network which utilizes a demodulated radio frequency echo pulse or video pulse developed by the radar receiver and a range gate pulse which is generated by a range gate pulse generator and which should be coincident with the center of the video pulse. The time of occurrence of the range gate pulse is determined by a range voltage which is proportional to the target range and which is applied to the range gate pulse generator. The range voltage is developed by a range voltage generating circuit included in the range-tracking network. When the target range remains unchanged, the range gate pulse continues to be coincident with the center of the video pulse and the range voltage also remains unchanged. If the target range changes, the range gate pulse will no longer coincide with the center of the video pulse. The range voltage must then be varied in magnitude and direction to make it proportional to the new target range and to make the range gate pulse again coincide with the center of the video pulse. Thus, the range voltage is proportional to the target range and variations in range voltage are proportional to the rate of change of the target range.

The target range is initially obtained by manually adjusting the magnitude of the range voltage to cause the range gate pulse generator to generate a range gate pulse which is approximately coincident with the center of the video pulse. When the range gate pulse is approximately coincident with the center of the video pulse, the range-tracking network is automatically put into operation whereby the magnitude of the range voltage developed by the range voltage generating circuit continuously and automatically diminishes or increases in proportion to the change in the target range to continuously and automatically advance or retard the time of occurrence of the range gate pulse to make it coincident with the center of the video pulse. For a more detailed description of the automatic range-tracking radar systems of the above type, reference is made to the copending patent application of Robert J. Shank et al., Serial Number 250,042, filed October 6, 1951, entitled, Disturbed Line-of-Sight Fire Control System.

The range voltage generating circuit compares the time of occurrence of two pulses and produces a varying direct-current voltage in response to the difference in the time of occurrence of the two pulses. In its application to a radar system, the range voltage generating circuit compares the time of occurrence of the range gate pulse with that of the center of the video pulse and produces a range voltage that varies in direction and magnitude according to the time difference of these two occurrences. To this end, the time of occurrence of the range gate pulse is compared with that of a composite signal which substantially is of sinusoidal waveshape. The composite signal is developed by the range voltage generating circuit by combining an input video pulse with a delayed and inverted image thereof.

If the range gate pulse is coincident with the center of the video pulse, the range gate pulse will also be centered on the composite signal and the range voltage will remain unchanged. On the other hand, if there is a difference in the time of occurrence between the range gate pulse and the center of the video pulse, the range gate pulse will not be centered on the composite signal and the range voltage generating circuit will vary the magnitude and polarity of the range voltage according to this time difference, thereby controlling the time of occurrence of the range gate pulse to maintain it coincident with the center of the received echo pulse. Thus, continuous, automatic, and accurate target range information is provided.

The range voltage generating circuit of the present invention, as described above, overcomes several disadvantages of prior art circuits. In contrast to the instant invention, prior circuits usually employ two separate channels for developing either two video pulses which are compared with one range gate pulse, or one video pulse which is compared with two range gate pulses, thereby requiring the use of additional components which increases the cost of production and increases the possibility of introducing errors. In addition, conventional circuits depend upon the balanced current conduction of high gain tubes to minimize drift of the generated range voltage. Balanced current conduction necessitates the critical adjustment of the gain of tubes and associated components, thereby reducing the stability of the overall range tracking system because the current conduction may become unbalanced with aging of the tubes and of the associated components so that a stable and accurate range voltage directly proportional to the range cannot be developed. Also, in the prior circuits the video pulse and the range gate pulse is applied to the same vacuum tube, thereby increasing the possibility of introducing errors due to slight fluctuations in the amplitude of the range gate pulse. The present invention eliminates errors which might be caused by slight fluctuations of the range gate pulse amplitude by applying the range gate pulse and the video pulse to separate parts of the range voltage generating circuit. Furthermore, this invention avoids the use of high gain tubes which must be critically adjusted for balanced current conduction, thereby greatly increasing the stability and the accuracy of the system.

It is, accordingly, an object of the present invention to provide a stable and accurate electronic circuit for developing a voltage indicative of the difference in the time of occurrence of two pulses.

Another object of the present invention is to provide a stable range voltage generating circuit for automatic range tracking by generating a voltage that is continuously, automatically, and accurately maintained proportional to the target range.

A further object of the present invention is to provide a range voltage generating circuit of increased stability and accuracy by avoiding the use of separate and distinct channels.

A still further object of the present invention is to provide a stable and accurate range voltage generating circuit which does not employ high gain tubes nor require the critical adjustment of circuit components.

The novel features which are believed to be characteristic of the invention, both as to its organization and method of operation, together with further objects and advantages thereof, will be better understood from the following description considered in connection with the accompanying drawings in which an embodiment of the invention is illustrated by way of example, and the scope of the invention is pointed out in the appended claims. In the drawings, Fig. 1 is a circuit diagram, partly in block form, of a range voltage generating circuit in accordance with the present invention; and Fig. 2 is a graph of voltage variations at different points in the circuit.

Referring now to Fig. 1, there is illustrated a video amplifier 10 coupled by a coupling capacitor 26 to a shorted delay line 27 and to a selection network 29. Video amplifier 10 includes an anode load resistor 11 connected between a suitable anode voltage source indicated as B+ and the plate 12 across which an output voltage may be developed and a conventional cathode biasing network 16 connected between the cathode 14 and ground for providing a bias voltage for grid 13. Delay line 27 may, for example, be a transmission line, an artificial transmission line, or a mercury delay line shorted at its far end which will develop a reflected signal by delaying and inverting the output voltage developed across anode resistor 11. This invention uses an artificial transmission line comprising a chain of sections containing series inductance and shunt capacitance and a matching resistor. An example of delay line 27 will be found in the patent reissued Nov. 9, 1943 to Harold M. Lewis, Reissue Number 22,390, entitled Television Receiver Synchronizing System. Selection network 29 is connected between B+ and a negative voltage supply indicated as B— and includes a voltage dropping resistor 32, a gate diode 30, voltage dropping resistors 35 and 36, a gate diode 31, and a voltage dropping resistor 39 connected in series. Selection circuit 29 also includes a switch diode 40, resistors 47 and 48, and a switch diode 41 connected in parallel with resistors 35 and 36. Resistor 32 is connected at junction point 53 to the plate 33 and resistor 35 is connected at junction point 55 to the cathode 34 of the gate diode 30. Similarly, resistor 39 is connected at junction point 54 to the cathode 38 and resistor 36 is connected at junction point 56 to the plate 37 of the gate diode 31. The two diodes 30 and 31 are thus connected in series and, since a potential difference is impressed across this series circuit, the two diodes are normally conducting, the flow of current being limited by the impedance of the diodes and the series resistors 39, 36, 35, and 32 whose resistances are such that the junction point 28 which is returned to ground through delay line 27 is normally at ground potential.

Cathode 43 of diode 40 is connected to cathode 34, as shown at junction point 55, while diode 41 is connected to plate 37, shown at junction point 56. Resistors 47 and 48 are serially connected between plate 42 and cathode 45.

An integrating circuit is connected to a junction point 46, and it includes a capacitor 50, one side of which is grounded, and resistors 47 and 48.

A conventional direct-current amplifier 51 is connected to the integrating circuit, the output of the former being connected to a range gate pulse generator 52 which may comprise a blocking oscillator, a multivibrator circuit, a sawtooth generator, and a coincidence circuit. A typical range gate pulse generator may be found on page 128 in volume 20 of the M. I. T. Radiation Laboratory Series entitled," Electronic Time Measurements," published in 1949 by the McGraw-Hill Book Company. The output of the range gate pulse generator 52 is connected to the grid 21 of a paraphase amplifier 17. The paraphase amplifier includes a triode whose cathode 22 is grounded through cathode resistor 23 and whose plate 20 is connected to B+ through plate resistor 18. Cathode 22 is connected to cathode 38 through a coupling capacitor 25 and plate 20 is coupled to plate 33 through a coupling capacitor 24.

The functioning of the circuit is as follows: a positive input video pulse 60 is applied to grid 13 by means of an input circuit 15, this pulse representing the selected echo pulse. Video pulse 60 (see also Fig. 2) is amplified and inverted by video amplifier 10 and impressed as a negative video pulse 61 across the shorted delay line 27 as well as applied to junction 28 of selection network 29. Pulse 61 is delayed by the delay line 27 for a time interval approximately equal to the pulse duration and inverted by the short terminating the line. The reflected pulse 62 is thus also applied to junction 28 so that pulse 61 is followed by pulse 62 and the two are impressed as a composite signal 66 which is of substantially sinusoidal wave shape, the leading portion of which is negative-going and the trailing portion of which is positive-going.

Range gate pulse 63 is generated by range gate pulse generator 52, and applied to grid 21 of paraphase amplifier 17 which simultaneously develops positive and negative range gate pulses 64 and 65 having equal amplitudes. The negative pulse 65 is impressed on plate 33 through capacitor 24, while the positive pulse 64 is impressed on the cathode 38 through capacitor 25. Thus, the range gate pulses 64 and 65, as well as the composite signal 66, are applied to the selection network 29.

As previously pointed out, the gate diodes 30 and 31 of selection network 29 are normally conducting, thereby developing a positive potential with respect to ground at the junction 55 and developing a negative potential with respect to ground at the junction 56. Since the potential drop across diodes when they are conducting is quite low, it may be stated for the purpose at hand that the plate and cathode potentials of the conducting diodes 30 and 31 are approximately equal. Therefore, cathode 43 of switch diode 40 is at a positive potential with respect to ground and plate 44 of switch diode 41 is at a negative potential with respect to ground. However, plate 42 and cathode 45 are maintained at substantially ground potential by the capacitor 50 which normally is very slightly charged, thereby maintaining junction 46 at practically ground potential. Hence, as long as gate diodes 30 and 31 are conducting, cathode 43 of switch diode 40 is positive with respect to its plate 42 and plate 44 of switch diode 41 is negative with respect to its cathode 45, thereby rendering the switch diodes 40 and 41 nonconducting as long as the gate diodes 30 and 31 are conducting.

When negative range gate pulse 65 is applied to plate 33 of gate diode 30 and positive range gate pulse 64 is simultaneously applied to cathode 38 of gate diode 31, plate 33 is made negative with respect to the cathode 34 and cathode 38 is made positive with respect to the plate 37, thereby rendering the diodes 30 and 31 nonconducting. Thus, during the application of range gate pulses 64 and 65, current ceases to flow through the diodes 30 and 31 so that the biasing positive potential at junction 55 and the biasing negative potential at junction 56 are removed, thereby bringing these junctions to ground potential through delay line 27. Consequently, switch diodes 40 and 41 now become operative and are permitted to conduct those portions of the composite signal 66 applied to junction 28 which coincide with range gate pulses 64 and 65. Diode 40 conducts during an early portion 68 and diode 41 conducts during a late portion 69 of composite signal 66.

The early or late portions 68 or 69 of the composite signal 66, during which each of diodes 40 and 41 will conduct, are determined by the time discrepancy existing between the centers of the simultaneous range gate pulses 64 and 65 and the center of the composite signal 66, the time discrepancy being proportional to and representative of changes in the target range.

The three columns of waveforms shown in Fig. 2 illustrate the relationships of the range gate and composite video pulses when the target range remains unchanged, when the target range decreases, and when the target range increases. Thus, when the target range remains unchanged, the centers of the range gate pulses 64 and 65 occur at the center of the composite signal 66 so that no time discrepancy exists and the early and late portions 68 and 69 of the composite signal 66 cause equal and opposite current conduction through switch diodes 40 and 41. This balanced conduction causes the net charge and hence the voltage across range storage capacitor 50 to remain unchanged, as illustrated by line 67 in Fig. 2.

When the range gate pulses 64 and 65 are not centered on the composite signal 66, the conduction of current through diodes 40 and 41 is no longer balanced and a resultant current flows in a direction corresponding to the direction of the time discrepancy. For example, should the target range decrease, the center of the composite signal 66 will occur earlier with respect to the centers of the pulses 64 and 65 and, consequently, diode 41 will conduct current longer than diode 40, as shown by the late and early portions 69′, 68′ of waveform 66′ in Fig. 2, thereby charging capacitor 50 positively to develop thereacross a slight positive voltage 67′. On the other hand, should the target range increase, the center of the composite signal 66 will occur later with respect to the centers of pulses 64 and 65 and, consequently, diode 40 will conduct current longer than diode 41, as shown by the early and late portions 68″, 69″ of waveform 66″, thereby charging range voltage capacitor 50 negatively to develop thereacross a slight negative voltage 67″.

The varying voltage developed across the capacitor 50 is the input signal to the direct-current amplifier 51. The output voltage developed by the amplifier 51 is the range voltage, the magnitude of which is proportional to the target range, and the change in magnitude of the range voltage is proportional to the rate of change of the target speed with respect to the radar system. This range voltage is applied to the range gate pulse generator 52 wherein it is utilized to advance or retard the time of occurrence of the range gate pulse 63, thereby advancing or retarding the range gate pulses 64 and 65 to center them with respect to composite signal 66. By centering the pulses 64 and 65 with respect to the composite signal 66, the pulse 63 is made to coincide with the center of the succeeding received echo pulse, thereby providing continuous, automatic, and accurate range information. The range voltage may also be employed in other networks of the radar system, not shown, to compute the rate at which the target speed is changing, which information, for example, is essential for gun fire control.

What is claimed is:

1. An electronic circuit for comparing the time of occurrence of an applied pulse of a predetermined duration with that of a reference pulse, said circuit comprising: a shorted delay line for developing, in response to the applied pulse, an image pulse of the predetermined duration but of opposite polarity to the applied pulse, said image pulse immediately following the applied pulse in time, said shorted delay line combining the applied pulse with the image pulse to form a composite signal; means for generating a pair of simultaneous reference pulses of opposite polarity with respect to each other and having substantially the predetermined duration; a coincidence gate circuit, said gate circuit having an input circuit coupled to said delay line to receive said composite signal, said gate circuit also including a pair of pulse input circuits, the respective reference pulse input circuits being connected to said reference pulse generating means to receive said reference pulses of opposite polarity, respectively, said coincidence gate circuit being operable upon occurrence of the reference pulses to develop a gated signal that comprises that portion of said composite signal that coincides with said reference pulses; and an integrating circuit coupled to said selection network and effective in response to said output signal to produce a direct-current voltage proportional to the difference in the time of occurrence of said applied and reference pulses.

2. In a pulse echo radar system wherein a receiver develops unidirectional video pulses of a predetermined duration in response to target echoes, a range voltage generating circuit comprising: a shorted delay line for developing, in response to the video pulses, unidirectional image pulses of the predetermined duration but of opposite polarity to the video pulses, each of said image pulses immediately following an associated video pulse in time, said shorted delay line combining each image pulse with its associated video pulse to form a composite signal; means for generating range gate pulses of substantially the predetermined duration; a selection network coupled to said delay line and to said means and operable upon occurrence of said range gate pulses to develop pairs of simultaneous gated signals, a pulse of each of said pairs being of opposite polarity with respect to the other pulse thereof, each of said gated signals comprising that portion of each of said composite signals that coincides with a corresponding range gate pulse; an integrating circuit coupled to said selection network for developing a varying direct-current output voltage in response to said gated signals; and a feedback network coupled between said integrating circuit and said means for developing a varying direct-current range voltage in response to said output voltage, said feedback network applying said range voltage to said means to advance or retard the time of occurrence of said range gate pulses, thereby to maintain a predetermined time relationship of each succeeding video pulse with respect to its corresponding range gate pulse.

3. In a pulse echo radar system wherein a receiver develops unidirectional video pulses of a predetermined duration in response to target echoes, a range voltage generating circuit comprising: an artificial transmission line having an input end, to which the video pulses are applied, and a shorted load end, said transmission line being operable in response to each of the unidirectional video pulses to produce a composite video pulse comprising the unidirectional video pulse immediately followed in time by an image pulse of opposite polarity to said video pulse at said input end; pulse generating means for generating simultaneous range gate pulses of substantially the predetermined duration; a rectifier coincidence gate circuit coupled to said pulse generating means and to said input end and operable upon occurrence of said range gate pulses to develop gated signals, each of said gated signals comprising those portions of said composite video pulses that coincide with a corresponding range gate pulse; an integrating circuit coupled to said gate circuit for developing a varying direct-current output voltage in response to said gated signals; and a direct-current amplifier coupled between said integrating circuit and said pulse generating means for developing a varying direct-current range voltage in response to said output voltage, said amplifier applying said range voltage to said pulse generating means to advance or retard the time of occurrence of said range gate pulses, thereby to maintain a predetermined time relationship of each succeeding video pulse with respect to its corresponding range gate pulse.

4. The range voltage generating circuit defined in claim 3, the circuit further including: a paraphase amplifier coupled between said pulse generating means and said selection network for simultaneously developing two output pulses of opposite polarity in response to each of said range gate pulses.

5. The range voltage generating circuit defined in claim 3, wherein said rectifier coincidence gate circuit comprises first and second gate rectifiers coupled to said pulse generating means, said gate rectifiers being normally conducting and being rendered nonconducting in response to and for the duration of each of said range gate pulses, and first and second switch rectifiers respectively coupled to said first and second gate rectifiers and also coupled between said input end and said integrating circuit, said switch rectifiers being normally nonconducting and being rendered operative in response to the occurrence of and for the duration of each of said range gate pulses to conduct current in response to each of said gated signals.

6. The range voltage generating circuit defined in claim 3, the circuit further including: a paraphase amplifier coupled to said pulse generating means, said paraphase amplifier having a first output terminal at which negative range gate pulses are developed and a second output terminal at which positive range gate pulses are developed, corresponding negative and positive range gate pulses being developed simultaneously in response to each of said range gate pulses; first and second gate rectifiers respectively coupled to said first and second output terminals, said gate rectifiers being normally conducting and being rendered nonconducting upon the application of said negative range gate pulses to said first gate rectifier and said positive range gate pulses to said second gate rectifier; and first and second switch rectifiers respectively coupled to said first and second gate rectifiers and also coupled between said input end and said integrating circuit, said switch rectifiers being normally nonconducting and being rendered operable in response to the occurrence of and for the duration of each of said range gate pulses to conduct current in response to each of said gated signals.

7. An electronic circuit for comparing the time of occurrence of a signal pulse of predetermined duration with a gate pulse, said circuit comprising: circuit means responsive to said signal pulse to develop an image pulse of the predetermined duration but of opposite polarity to the signal pulse, said image pulse immediately following said signal pulse in time, said signal pulse and said image pulse constituting a composite signal having equal positive and negative half cycles; means for generating simultaneous gate pulses of opposite polarity with respect to each other and of substantially the predetermined duration; a selection network, said selection network including a pair of unidirectional conductive devices, said devices being connected in series through a common junction, said devices being adapted to be normally conductive; said devices being adapted to receive said gate pulses and to be made nonconductive during the occurrence of said gate pulses; said common junction being connected to said circuit means; first and second rectifiers, said first and second rectifiers being coupled to said junction and adapted to be conductive during the respective positive and negative half cycles of said composite signal; and means coupled to said first and second rectifiers to develop an output signal representative of the difference in the periods of conduction of said first and second rectifiers.

References Cited in the file of this patent
UNITED STATES PATENTS

| | | |
|---|---|---|
| 2,534,329 | Wilkerson | Dec. 19, 1950 |
| 2,577,536 | MacNichol | Dec. 4, 1951 |